(12) United States Patent
Sardina (10) Patent No.: US 12,263,760 B1
(45) Date of Patent: *Apr. 1, 2025

(54) SYSTEMS AND METHODS FOR USING AIRFLOW TO CHARGE AN ELECTRIC BATTERY OF A VEHICLE

(71) Applicant: Vela De Vento Corporation, Smithtown, NY (US)

(72) Inventor: Joshua M. Sardina, San Diego, CA (US)

(73) Assignee: Vela De Vento Corporation, Smithtown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,694

(22) Filed: Oct. 11, 2024

Related U.S. Application Data (63) Continuation of application No. 18/603,695, filed on Mar. 13, 2024, now Pat. No. 12,145,472.

(51) Int. Cl.
*H01M 10/46* (2006.01)
*B60L 8/00* (2006.01)
*H02J 7/00* (2006.01)

(52) U.S. Cl.
CPC ............ *B60L 8/006* (2013.01); *H02J 7/0048* (2020.01)

(58) Field of Classification Search
CPC ........ H02J 7/0042; H02J 7/0048; B60L 8/006
USPC ...... 320/101, 104, 107, 114; 290/43, 44, 54, 290/55
See application file for complete search history.

(56) References Cited

U.S. PATENT DOCUMENTS

| | | | | |
|---|---|---|---|---|
| 5,680,032 | A * | 10/1997 | Pena | B60L 50/30 290/55 |
| 8,664,782 | B1 * | 3/2014 | Kim | F03D 15/20 290/55 |
| 9,228,563 | B2 * | 1/2016 | Thomazios | F03D 1/025 |
| 9,802,492 | B2 | 10/2017 | Sikroria et al. | |
| 10,173,533 | B1 | 1/2019 | Bird | |
| 12,145,472 | B1 * | 11/2024 | Sardina | B60L 8/006 |
| 2007/0262584 | A1 * | 11/2007 | Lu | F03D 9/25 290/55 |
| 2011/0316470 | A1 * | 12/2011 | Rogers | F03D 9/32 320/101 |

FOREIGN PATENT DOCUMENTS

| | | |
|---|---|---|
| KR | 101934835 B1 | 3/2019 |
| WO | 2020142811 A1 | 7/2020 |

* cited by examiner

*Primary Examiner* — Edward Tso
(74) *Attorney, Agent, or Firm* — Carter, DeLuca & Farrell, LLP; George Likourezos, Esq.

(57) ABSTRACT

An airflow charging system and vehicle include a turbine, a driveline pulley and a driving belt, a main charging pulley and a charging belt, a processor, and a memory. The turbine is configured to rotate the driveline pulley, and the driveline pulley is operably connected to an electric motor. The main charging pulley is operably connected to the electric motor, and rotation of the main charging pulley is configured to charge a battery. The battery provides power to the electric motor. The memory includes instructions stored thereon, which, when executed by the processor, cause the system to receive a first signal indicating that the vehicle is in motion, operate the electric motor to rotate the turbine, receive a second signal from the vehicle indicating a vehicle speed, and, if the vehicle speed is greater than or equal to a predetermined speed, stop operating the electric motor.

20 Claims, 10 Drawing Sheets

SYSTEMS AND METHODS FOR USING AIRFLOW TO CHARGE AN ELECTRIC BATTERY OF A VEHICLE

CROSS-REFERENCE TO RELATED APPLICATIONS

This application is a continuation of U.S. patent application Ser. No. 18/603,695, filed Mar. 13, 2024, the entire contents of which are incorporated by reference herein.

TECHNICAL FIELD

This disclosure relates generally to charging systems and methods for charging for electric batteries, and in particular to systems and methods for using airflow to charge an electric battery of a vehicle.

BACKGROUND

Traditional vehicles, reliant on fossil fuels, emit harmful pollutants into the atmosphere, contributing significantly to air pollution. Traditional vehicles additionally contribute to noise pollution, disrupting urban environments and negatively impacting the well-being of communities. Moreover, fossil fuels have finite availability, and do not provide a truly sustainable solution for transportation. To address these detriments, the use of electric motors in vehicles has become more widespread. Charging electric vehicles often relies on stationary charging stations, restricting the flexibility and convenience of electric motor operation, and preventing adoption in areas with limited infrastructure. Alternative available energy sources, such as wind, fail to be utilized within vehicle charging systems.

SUMMARY

An aspect of this disclosure provides an airflow charging system, including a turbine, a driveline pulley, a main charging pulley, a processor, and a memory. The turbine is configured to rotate a driveline pulley. The driveline pulley includes a driving belt and is configured to be operably connected to an electric motor. The main charging pulley is operably connected to the electric motor and includes a charging belt. Rotation of the main charging pulley is configured to charge a battery, and the battery provides power to the electric motor. The memory includes instructions stored thereon, which, when executed by the processor cause the system to receive a first signal indicating that a vehicle is in motion, operate the electric motor to rotate the turbine, receive a second signal from the vehicle indicating a vehicle speed, and, if the vehicle speed is greater than or equal to a predetermined speed, stop operating the electric motor.

In another aspect of this disclosure, the electric motor may not be operated to rotate the turbine if the first signal indicates a backward motion of the vehicle.

In yet another aspect of this disclosure, the system may further include a sensor configured to determine a tension of the driving belt and a tension of the charging belt.

In a further aspect of this disclosure, the system may further include a sensor, and the instructions, when executed by the processor, may further cause the system to determine a charge percentage of the battery, and, if the charge percentage of the battery is above a predetermined threshold, disconnect the main charging pulley from charging the battery.

In an aspect of this disclosure, the system may further include a sensor, and the instructions, when executed by the processor, may further cause the system to determine a charge percentage of the battery, and, if the charge percentage of the battery is above a predetermined threshold, prevent the turbine from rotating, thereby preventing main charging pulley from charging the battery.

In another aspect of this disclosure, the instructions, when executed by the processor, may further cause the system to, after electric motor has been stopped from operating to rotate the turbine, receive a third signal from the vehicle indicating the vehicle speed, and if the vehicle speed is less than the predetermined speed, operate the electric motor to rotate the turbine.

In yet another aspect of this disclosure, the instructions, when executed by the processor, may further cause the system to, prior to receiving the first signal, initiate movement of a vehicle from a stationary state via the electric motor.

In a further aspect of this disclosure, the system may further include a fan configured to provide air to the turbine. The instructions, when executed by the processor, may further cause the system to, prior to receiving the first signal, initiate movement of the vehicle from a stationary state via the fan.

In another aspect of this disclosure, the system may further include a fan configured to provide air to the turbine. The electric motor may be operated to rotate the turbine by operating the fan.

In yet another aspect of this disclosure, the system may further include a fan configured to provide air to the turbine. The instructions, when executed by the processor, may further cause the system to receive a third signal indicating a rotational velocity of the turbine, and, if the rotational velocity of the turbine is less than a maximum rotational velocity of the turbine, selectively operate the fan by the electric motor to increase the rotational velocity of the turbine.

An aspect of this disclosure provides a vehicle for using airflow to charge an electric motor, the vehicle including a turbine, a driveline pulley, an electric motor, a main charging pulley, a battery, a processor, and a memory. The turbine is disposed within a partially enclosed space, and is configured to rotate upon air entering the partially enclosed space. The turbine is configured to rotate the driveline pulley, and the driveline pulley includes a driving belt. The electric motor is operably connected to the driveline pulley. The main charging pulley is operably connected to the electric motor, and the main charging pulley includes a charging belt. Rotation of the main charging pulley is configured to charge the battery, and the battery provides power to the electric motor. The memory includes instructions stored thereon, which, when executed by the processor cause the vehicle to receive a first signal indicating that the vehicle is in motion, operate the electric motor to rotate the turbine, receive a second signal from the vehicle indicating a vehicle speed, and, if the vehicle speed is greater than or equal to a predetermined speed, stop operating the electric motor.

In another aspect of this disclosure, the vehicle may further include an air intake vent. The air intake vent may permit air to enter the partially enclosed space to rotate the turbine.

In yet another aspect of this disclosure, the vehicle may further include an air exit outlet for the air to exit the vehicle. Air may be routed from the partially enclosed spaced to the air exit outlet.

In a further aspect of this disclosure, the vehicle may further include an air filter configured to filter the air prior to the air exiting the vehicle through the air exit outlet.

In another aspect of this disclosure, the vehicle may further include a sensor. The instructions, when executed by the processor, may further cause the vehicle to determine a charge percentage of the battery, and, if the charge percentage of the battery is above a predetermined threshold, disconnect the main charging pulley from charging the battery.

In another aspect of this disclosure, the vehicle may further include a sensor. The instructions, when executed by the processor, may further cause the vehicle to determine a charge percentage of the battery, and, if the charge percentage of the battery is above a predetermined threshold, prevent the turbine from rotating, thereby preventing main charging pulley from charging the battery.

In yet another aspect of this disclosure, the instructions, when executed by the processor, may further cause the vehicle to, after electric motor has been stopped from operating to rotate the turbine, receive a third signal from the vehicle indicating the vehicle speed, and if the vehicle speed is less than the predetermined speed, operate the electric motor to rotate the turbine.

In a further aspect of this disclosure the instructions, when executed by the processor, may further cause the vehicle to, prior to receiving the first signal, initiate movement of the vehicle from a stationary state via the electric motor.

In another aspect of this disclosure, the vehicle may further include a fan configured to provide air to the turbine. The instructions, when executed by the processor, may further cause the vehicle to, prior to receiving the first signal, initiate movement of the vehicle from a stationary state via the fan.

In yet another aspect of this disclosure, the vehicle may further include a fan configured to provide air to the turbine. The electric motor may be operated to rotate the turbine by operating the fan.

In another aspect of this disclosure, the vehicle may further include a fan configured to provide air to the turbine. The instructions, when executed by the processor, may further cause the vehicle to receive a third signal indicating a rotational velocity of the turbine, and, if the rotational velocity of the turbine is less than a maximum rotational velocity of the turbine, selectively operate the fan by the electric motor to increase the rotational velocity of the turbine.

An aspect of this disclosure provides a method for using airflow to charge the electric battery of a vehicle. Initially, the vehicle may be powered by an electric motor causing a turbine to rotate. Upon a signal being sent that the vehicle has reached a predetermined speed, airflow is permitted to enter the vehicle to rotate the turbine, and the electric motor may be disconnected from causing the turbine to rotate. Additional signals may be sent to communicate that the vehicle has fallen below the predetermined speed, in which case the electric motor would again cause the turbine to rotate until the predetermined speed is reached.

Further details and aspects of the present disclosure are described in more detail below with reference to the appended drawings.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. As used herein, the term "vehicle" refers to automobiles, aircraft, electric bikes, and the like.

Figure 1:
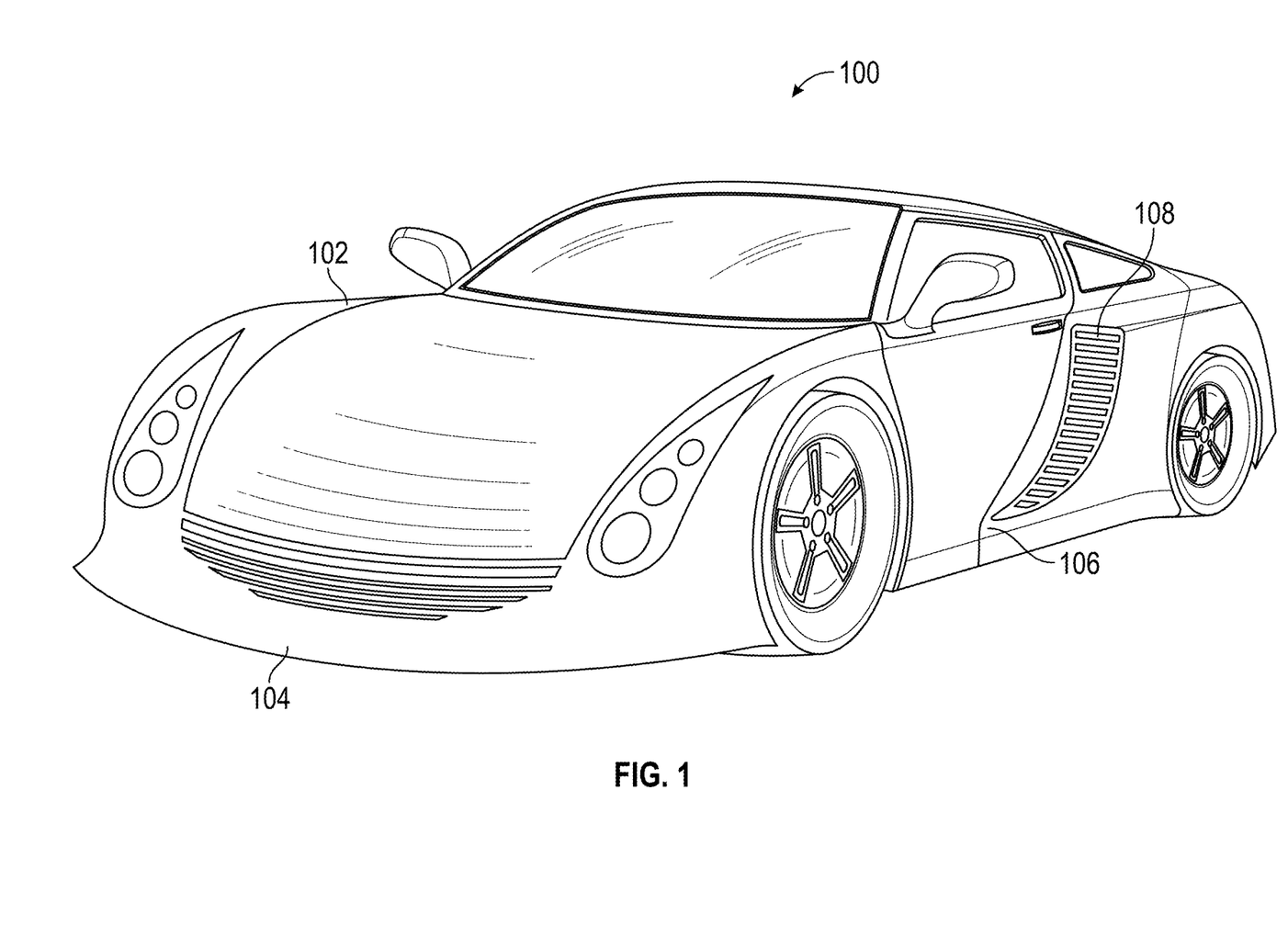
FIG. 1 illustrates an exemplary system for using airflow to charge the battery of an electric motor as incorporated into a vehicle, including an air intake vent, in accordance with aspects of the present disclosure.

Referring to FIG. 1, a system 100 for using airflow to charge an electric motor of a vehicle is shown. System 100 generally includes a vehicle 102 and an airflow charging system 120, with airflow charging system 120 shown in detail in FIG. 2A. A body of vehicle 102 may be constructed from carbon fiber, while components of airflow charging system 120 may be manufactured from aluminum, titanium, or the like. To supply airflow charging system 120 with air, vehicle 102 may include an air intake vent 108 on a side 106 of vehicle 102. Air intake vent 108 may also be disposed on a front 104 of vehicle 102 to maximize a volume of air entering airflow charging system 120. When in an open position, air intake vent 108 is configured to permit passage of air to airflow charging system 120 while preventing debris from entering airflow charging system 120. Therefore, air intake vent 108 may include a grate, a screen, a grille, or the like. Air intake vent 108 may also be closed, to prevent air from entering airflow charging system 120.

Figure 2A:
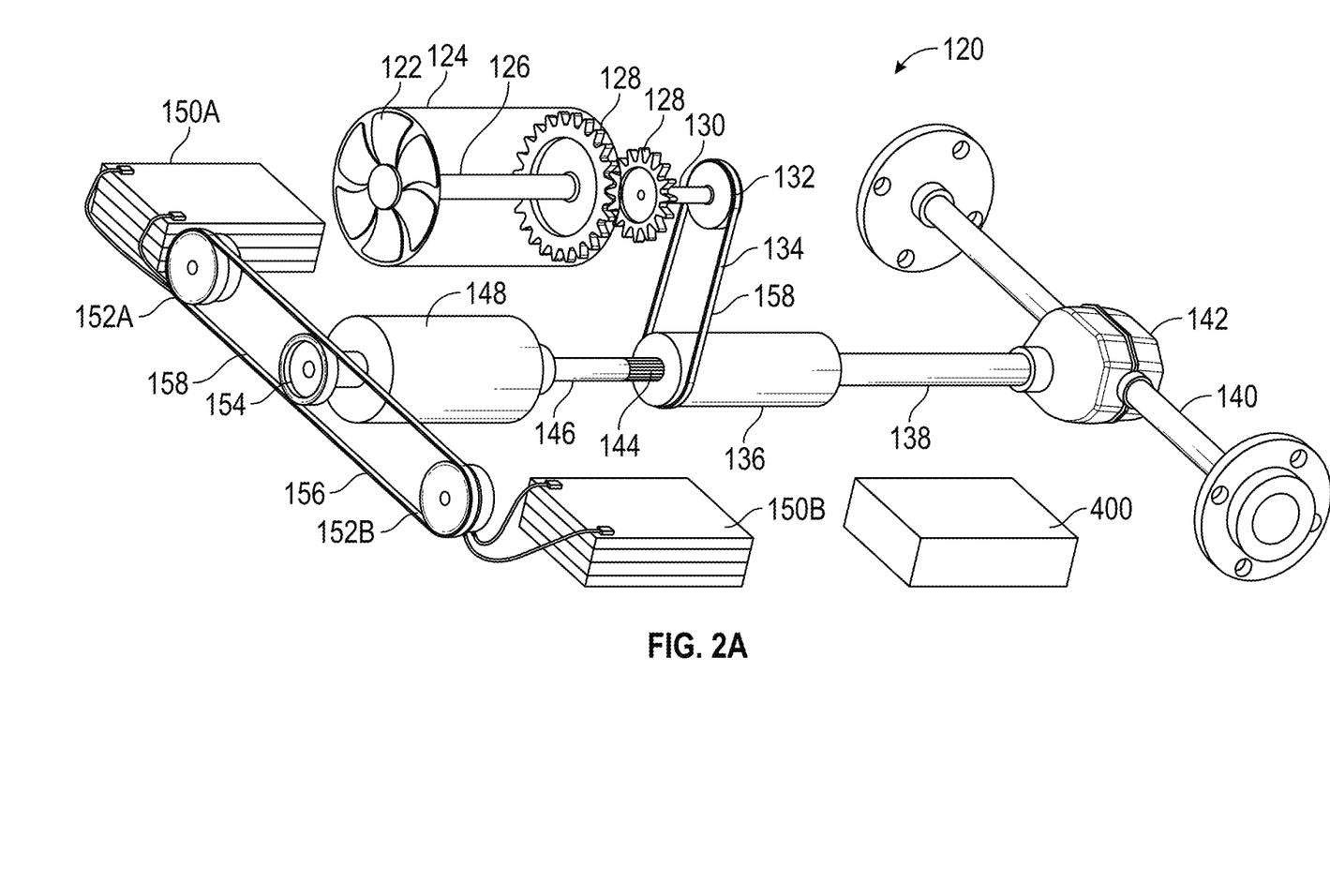
FIG. 2A shows a configuration of an airflow charging system, as used within the vehicle of FIG. 1, in accordance with aspects of the present disclosure.
Figure 2B:
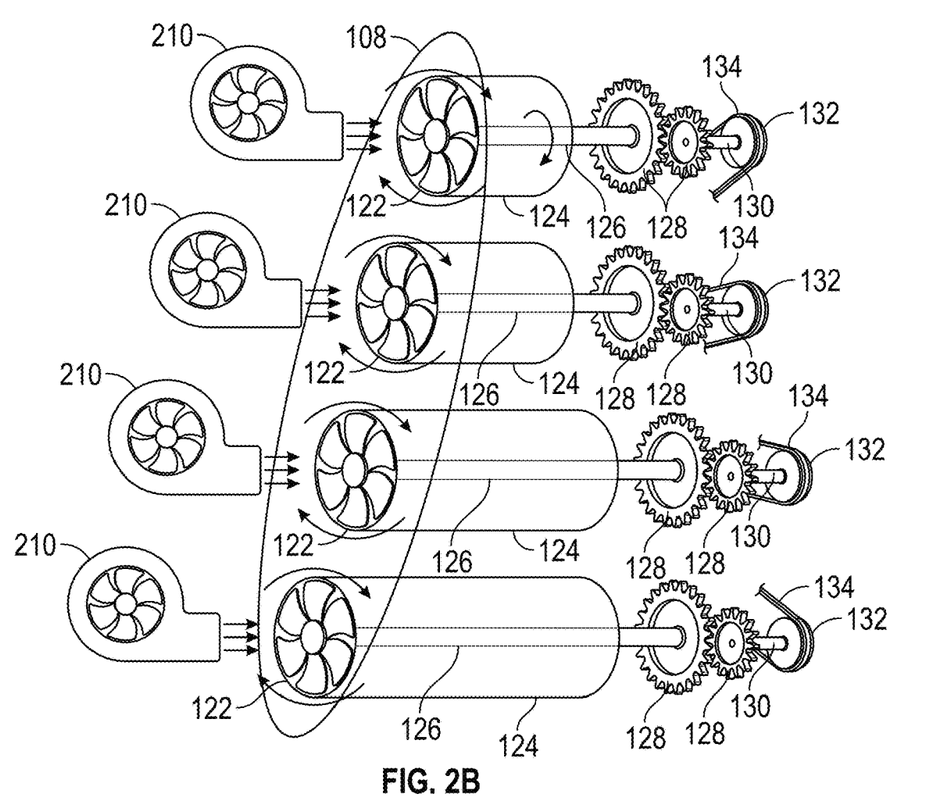
FIG. 2B illustrates a partial arrangement of the airflow charging system of FIG. 2A, located behind the air intake vent of the vehicle, in accordance with aspects of the present disclosure.
Figure 2C:
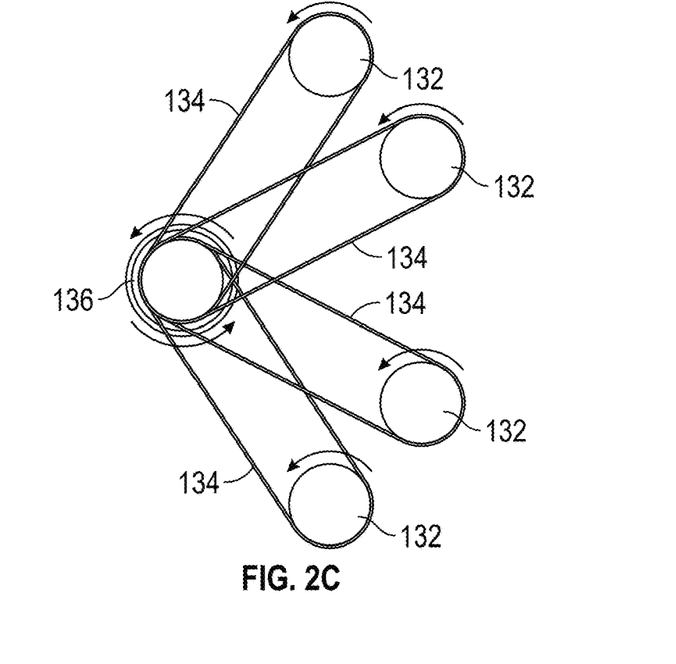
FIG. 2C is another partial arrangement of the airflow charging system of FIG. 2A, in accordance with aspects of the present disclosure.

FIGS. 2A through 2C show airflow charging system 120, located within vehicle 102. Although FIGS. 2A through 2C depict vehicle 102 as an automobile, it is contemplated that airflow charging system 120 may be configured to suit a variety of different vehicle types, some of which will be later described in FIGS. 7A through 8B. For purposes of clarity, FIG. 2A shows a simplified version of airflow charging system 120. Airflow charging system 120 generally includes a turbine 122, a driving belt 134, a driveline pulley 136, an electric motor 148, a charging pulley 154, a charging belt 156, and a controller 400. Once air enters airflow charging system 120 through air intake vent 108, it enters turbine cylinder 124, within which turbine 122 is disposed. Turbine 122 may be disposed on a gear drive shaft 126, and may be connected to a first gear 128. Air entering turbine cylinder 124 causes turbine 122 to rotate, thereby rotating first gear 128. A second gear 128 may be in meshed engagement with the first gear, and may be caused to rotate upon input from first gear 128. Second gear 128 may be disposed on a gear output shaft 130, on which a pulley 132 may also be disposed. Via driving belt 134, rotation of pulley 132 may cause driveline pulley 136 to rotate. An end of driveline pulley 136 may be connected, for example, to a drive shaft 138 of vehicle 102. Drive shaft 138 may connect to an axle differential 142 and an axle 140 of vehicle 102, for example, a rear axle, to facilitate movement of vehicle 102. An opposite end of driveline pulley 136 may connect to a slip joint spline 144, or yoke, which in turn may connect to an electric motor shaft 146, and thereby connect driveline pulley 136 to electric motor 148.

Electric motor 148, particularly, a rotor of electric motor 148, may rotate simultaneously with driveline pulley 136, ultimately allowing airflow charging system 120 to charge a battery 150 which provides power to electric motor 148. Electric motor 148 may connect directly to charging pulley 154, or may be connected to charging pulley 154 by charging belt 156, causing charging pulley 154 to rotate. It is contemplated that, in aspects, such as those later described with reference to FIG. 4, charging pulley 154 may be rotated by driveline pulley 136, or may instead cause electric motor 148 to rotate. Charging pulley 154 may connect directly to battery 150, or may connect to one or more auxiliary charging pulleys 152 to charge one or more batteries 150. As shown in FIG. 2A, rotation of charging pulley 154, and therefore driving of charging belt 156, may drive rotation of a first auxiliary charging pulley 152A and a second auxiliary charging pulley 152B. First auxiliary charging pulley 152A may connect to and charge a first battery 150A, and second auxiliary charging pulley 152B may connect to and charge a second battery 150B. First battery 150A and second battery 150B may provide power to electric motor 148.

Sensor(s) 158 may be disposed on each of driving belt 134 and charging belt 156 to monitor belt tension. Some sensors 158 may communicate information on belt tension to controller 400 in order to determine the charging quality of charging belt 156, as well as the power loss of driving belt 134. Additional sensors 158 may be disposed elsewhere within airflow charging system 120, and may cause controller 400 to initiate certain actions. For example, a sensor 158 may be disposed on turbine 122, gear drive shaft 126, or the like for detecting a rotational velocity of turbine 122. Upon determining via controller 400 that turbine 122 is rotating below a maximum velocity, controller 400 may operate a fan 210 disposed in front of turbine 122, as shown in FIG. 2B, in order to supplement air flow to turbine 122 and thereby increase the rotational velocity of turbine 122. Controller 400 may operate fan 210 upon receiving a user input, or upon a predetermined criteria being met.

Another sensor 158 may be located at battery 150, to determine a charge percentage of battery 150. Should the sensor 158 determine that battery 150 is charged up to a certain percent value, for example, 80% to 90%, controller 400 may turn battery 150 off or disconnect battery 150 from charging pulley 154 to prevent overcharging, which could lead to a reduction in battery life. Overcharging may also be prevented by locking turbines 122 in place and preventing turbines 122 from rotating. In further aspects, controller 400 may not permit turbines 122 to rotate, and therefore may not charge battery 150 by charging pulley 154, until sensor 158 determines that the percent charge of battery 150 has fallen below a threshold value. The threshold value of battery 150 may correspond to a necessary level of charge for operation. For example, the threshold value of battery 150 may be about 50% charge, although other threshold values are contemplated. If sensor 158 determines that the percent charge of battery 150 is above 50%, turbines 122 may be locked in place on gear drive shaft 126 and therefore prevented from rotating via airflow. When turbines 122 are locked in place, charging pulley 154 may be prohibited from providing charge to battery 150. However, if sensor 158 determines that the percent charge of battery 150 has fallen below the threshold value of 50%, controller 400 may unlock turbines 122, therefore allowing rotation of turbines 122 and charging of battery 150 via airflow generated by movement of vehicle 102 or by operation of fans 210. Thus, overcharging of battery 150 may be avoided and the performance of airflow charging system 120 may be optimized, ensuring efficient discharge of power from battery 150 to electric motor 148.

In practice, airflow charging system 120 may include a number of turbines 122 located at different portions of vehicle 102, each contributing to the rotation of driveline pulley 136. For example, a number of turbines 122 may be located at front side 104 or a rear side 110 (FIG. 5) of vehicle 102. Additionally, as shown in FIG. 2B, turbines 122 may be located on side 106 of vehicle 102, particularly behind air intake vent 108. As described earlier, fans 210 may be disposed in front of turbines 122. For example, fans 210 may be integrated into side 106 of vehicle 102, upstream from air intake vent 108, to generate airflow toward turbines 122. Fans 210 may correspond to respective turbines 122, such that each fan 210 is configured to provide air to an associated turbine 122. Fans 210 may be turbo fans or any variety of high-powered fan capable of causing turbines 122 to rotate. Each turbine 122 of the number of turbines 122 may be housed within a respective turbine cylinder 124 and connected to a respective gear drive shaft 126. Each gear drive shaft 126 may connect to a respective first gear 128, each of which may in turn connect to a respective second gear 128 disposed on gear output shaft 130. It is contemplated that additional gears 128 may be disposed between first gear 128 and second gear 128. Each gear output shaft 130 may operably rotate a pulley 132 disposed thereon, and each pulley 132 may drive a respective driving belt 134.

As shown more clearly in FIG. 2C, each driving belt 134 connects to driveline pulley 136 to collectively actuate rotation of driveline pulley 136, thereby powering drive shaft 138 and consequently powering rear differential 142 and axle 140 to drive movement of vehicle 102. Driveline pulley 136 may be sized and shaped to accommodate any of or all driving belts 134 of airflow charging system 120 thereon. In order for pulleys 132 to effectively power driveline pulley 136, each pulley 132 must rotate in the same direction. For example, each pulley 132 may rotate in a counterclockwise direction, such that the rotation of each pulley 132 combines to cause driveline pulley 136 to rotate in a counterclockwise direction. Turbines 122 and corresponding pulleys 132 may be vertically stacked on top of each other, as shown, may be horizontally spaced, or may be arranged in any configuration necessary to fit within airflow charging system 120 and vehicle 102.

Figure 3:
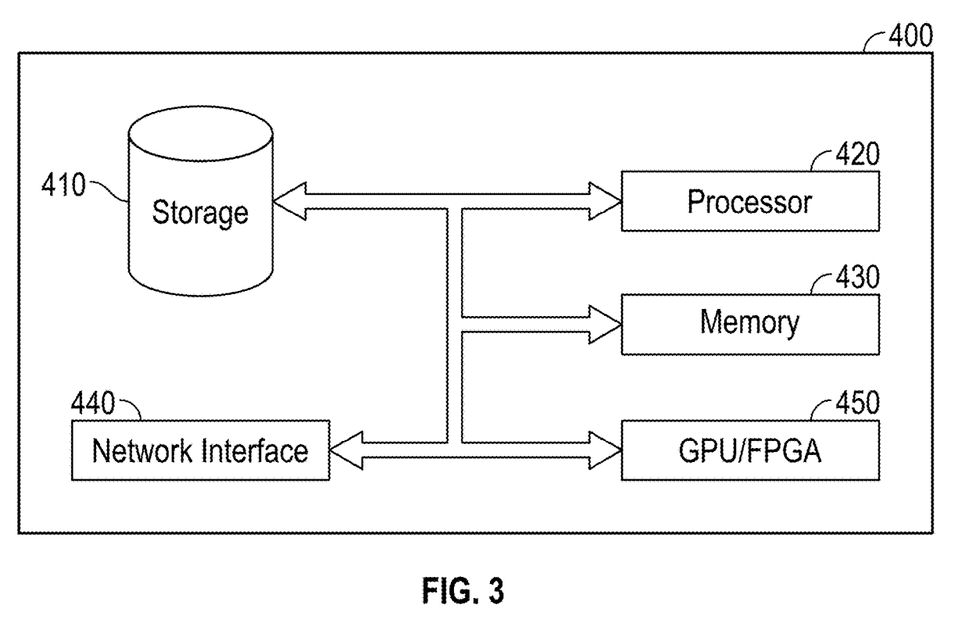
FIG. 3 is a block diagram of a computing device configured for use with the airflow charging system, in accordance with aspects of the present disclosure.

FIG. 3 shows that controller 400 includes a processor 420 connected to a computer-readable storage medium or a memory 430. The computer-readable storage medium or memory 430 may be a volatile type of memory, e.g., RAM, or a non-volatile type of memory, e.g., flash media, disk media, etc. In various aspects of the disclosure, the processor 420 may be another type of processor, such as a digital signal processor, a microprocessor, an ASIC, a graphics processing unit (GPU) configured to display results, or a GUI on a display, a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 430 can be random access memory, read-only memory, magnetic disk memory, solid-state memory, optical disc memory, and/or another type of memory. In some aspects of the disclosure, the memory 430 can be separate from the controller 400 and can communicate with the processor 420 through communication buses of a circuit board and/or through communication cables such as serial ATA cables or other types of cables. The memory 430 includes computer-readable instructions that are executable by the processor 420 to operate the controller 400. In other aspects of the disclosure, the controller 400 may include a network interface 440 to communicate with other computers or to a server. A storage device 410 may be used for storing data.

Figure 4:
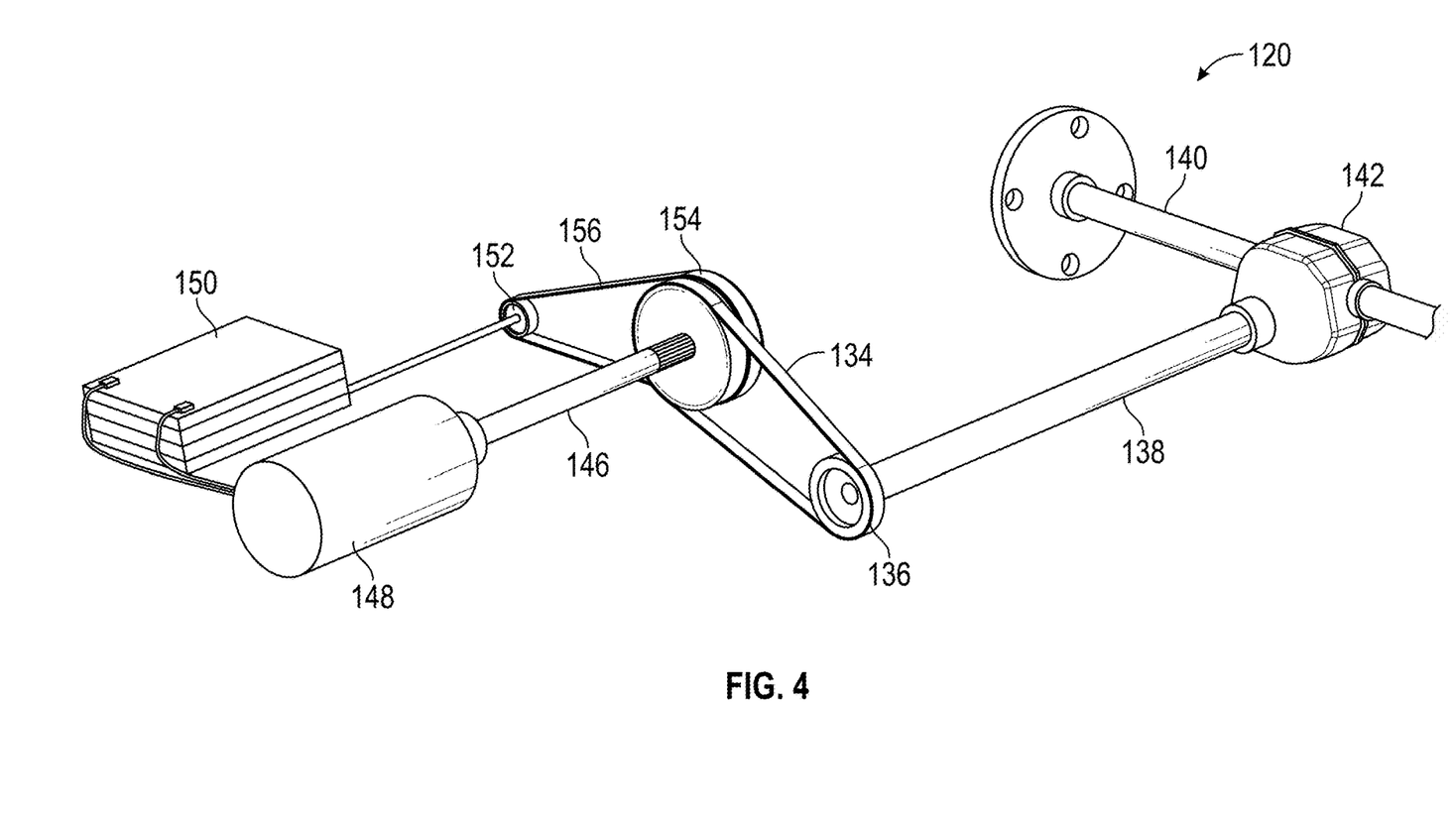
FIG. 4 depicts another configuration of a charging system, in accordance with aspects of the present disclosure.

In aspects, even without harnessing the flow of air through vehicle 102, power may be recouped while using electric motor 148, as shown in FIG. 4. In FIG. 4, electric motor 148 is operated to rotate electric motor shaft 146, which connects to charging pulley 154. In this configuration, charging pulley 154 may connect to driveline pulley 136 via driving belt 134 to power drive shaft 138 and consequently power rear differential 142 and axle 140. While connected to driving belt 134, charging pulley 154 may simultaneously connect to charging belt 156 to drive rotation of auxiliary charging pulley 152. Auxiliary charging pulley 152 may connect to battery 150, and may provide power to charge battery 150. In turn, battery 150 may supply electric motor 148 with power. Therefore, during operation of electric motor 148, energy expended to power vehicle 102 can be at least partially recaptured using charging pulley 154 and auxiliary charging pulley 152. Through use of airflow charging system 120, vehicle 102 may operate more sustainably and may travel greater distances without needing to stop to charge battery 150 at a charging station.

Figure 5:
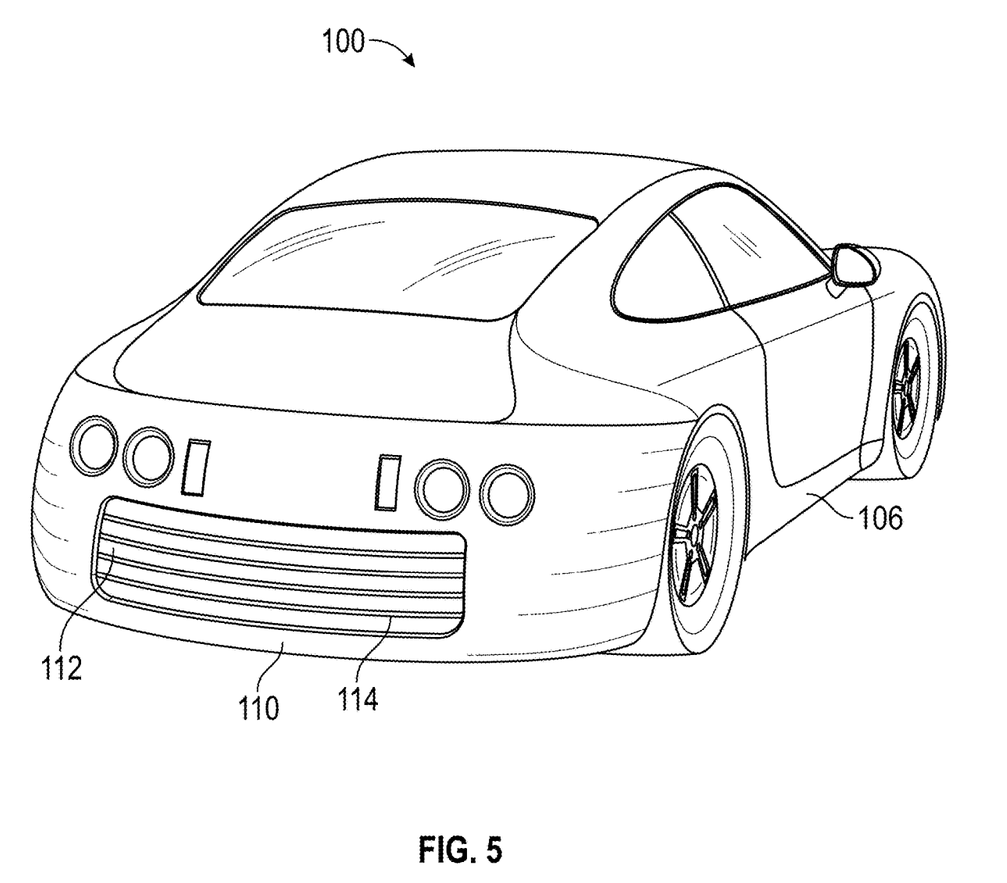
FIG. 5 shows a rear view of the vehicle and airflow charging system of FIG. 1, including an air exit outlet, in accordance with aspects of the present disclosure.

FIG. 5 shows rear side 110 of vehicle 102, and in particular, an air exit outlet 112. As will be explained in greater detail in the following paragraphs, vehicle 102 may be powered by air traveling therethrough. For example, once air enters system 100 through air intake vent 108 and subsequently enters turbine cylinder 124 to rotate turbine 122, the air is routed out of an air exit outlet 112 located on rear side 110 of vehicle 102. The air is routed from turbine cylinder 124 out of air exit outlet 112 to reduce air resistance and drag that might result from forcing air into a condensed space, which could thereby cause vehicle 102 to slow down. Additionally, an air exit filter 114 may be installed at air exit outlet 112, allowing system 100 to trap pollutants and emissions released from surrounding vehicles powered by fuel.

A method of operating system 100, using an automobile, will now be described. To begin, vehicle 102 may be powered on by electric motor 148. Air intake vent 108 may initially be closed, allowing vehicle 102 to fully rely on power provided by electric motor 148. In other aspects, air intake vent 108 may remain open with electric motor 148 still acting as a primary source of power for system 100 at the outset of operation. Depending upon an initial direction of movement of vehicle 102, vehicle 102 may "push off" from a stationary state in different ways. If vehicle 102 will be moving backwards, or in reverse, electric motor 148 may act to directly rotate drive shaft 138. However, if vehicle 102 will be moving forwards, electric motor 148 may either directly rotate drive shaft 138, or cause turbine 122 to rotate, thus pushing air through system 100 to propel vehicle 102 forward. Depending upon traffic conditions, for example, stop-and-go traffic or commuter traffic, it may be ideal for electric motor 148 to directly rotate drive shaft 138. On more open roads, it may be preferable to propel vehicle 102 using turbine 122, such that vehicle 102 and turbine 122 is able to gain momentum.

Electric motor 148 may cause turbine 122 to rotate by using a number of different means. Electric motor 148 may cause gear drive shaft 126 to rotate in order to rotate turbine 122. Alternatively, as previously noted, fan 210 may be disposed ahead of turbine 122. Electric motor 148 may power fan 210, thereby generating air to cause turbine 122 to rotate. Additional means of rotating turbine 122 by electric motor 148 are also contemplated. Even in situations in which airflow is not yet traveling system 100, as shown in FIG. 4, battery 150 of electric motor 148 may still be charged by airflow charging system 120.

After initial movement and acceleration of vehicle 102, and once vehicle 102 reaches a predetermined speed at which airflow entering airflow charging system 120 would be capable of sustaining motion of vehicle 102, airflow may act as the primary source of power for vehicle 102. Air intake vent 108, if previously closed, may be opened, allowing airflow to rotate turbine 122 to power vehicle 102. Electric motor 148 may be stopped from exerting power to rotate turbine 122. Alternatively, electric motor 148 may supplement the airflow entering airflow charging system 20 to ensure that vehicle 102 does not fall below the predetermined speed. As discussed earlier, air may be accelerated by fan 210 before passing turbine 122. Fan 210 may be a high-powered fan, and may propel air through airflow charging system 120, allowing vehicle 102 to move at greater speeds. Additional fans 210 may be disposed throughout airflow charging system 120 to accelerate air through vehicle 102 and increase speed. For example, fan 210 may be located in proximity to air exit outlet 112. Fan 210 may be activated by user control, programming of controller 400, or other suitable means.

Figure 6:
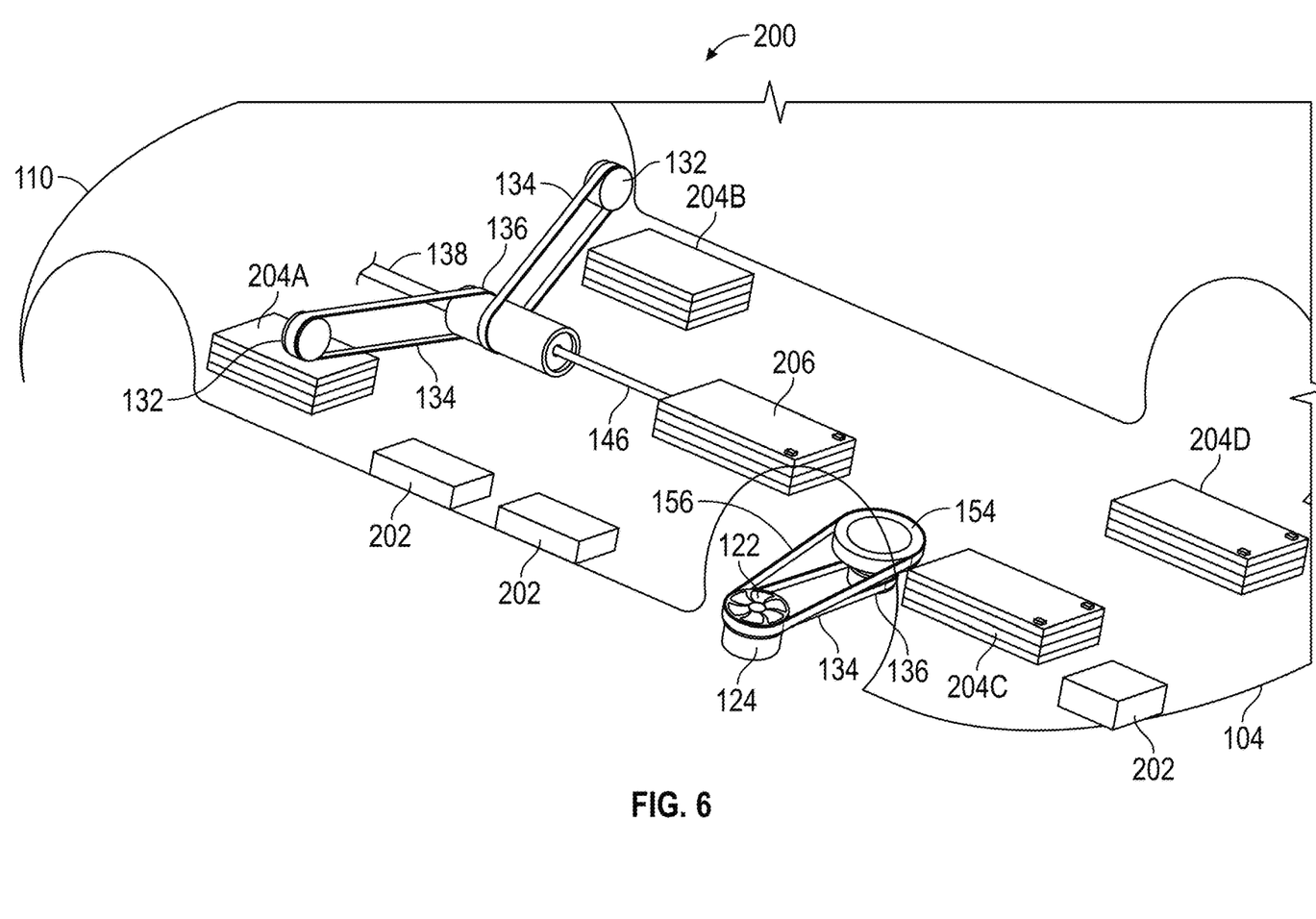
FIG. 6 illustrates another alternative configuration of an airflow charging system, in accordance with aspects of the present disclosure.

FIG. 6 depicts an alternative system 200 for using airflow to charge an electric motor of a vehicle. In system 200, vehicle 102 may be a hovercraft, a vehicle capable of hovering in response to external factors, or the like. The vehicle 102 of system 200 may include wheels, and may otherwise be configured as a standard automobile. To cause vehicle 102 to hover, a number of electric motors 204 and a main electric motor 206 may be included to provide lift and motion. For example, electric motors 204A through 204D could be provided at each corner of vehicle 102. In system 200, each of electric motors 204A through 204D may connect to a respective driveline pulley 136, charging pulley 154, and turbine 122, all of which are controlled by controller 400. In this configuration, turbine cylinder 124 may be pointed downward to generate lift, and a respective turbine 122 of each of electric motors 204A through 204D could be individually powered to affect the pitch, roll, and yaw of vehicle 102. Turbines 122 of electric motors 204A through 204D may be disposed inwards from wheel wells of vehicle 102, such that rotation of turbines 122 pushes air (or water, as will be described below) out through the wheel well, around a tire, or downwards. Additional fans 210 may be disposed in front of each of turbines 122 to supplement air flow to turbines 122 and increase rotational velocity of turbines 122. Additional fans 210 may also provide air flow to turbines 122 to propel vehicle 102, for example, fans 210 may be disposed at back side 110 of vehicle 102 to propel air out of vehicle 102 and encourage forward motion of vehicle 102. Controller 400 may operate additional fans 210 to provide air flow to turbines 122 upon receiving a user input, or upon a determined criteria being met.

Each turbine cylinder 124 may be capable of full rotation (i.e., 360-degree rotation), such that each turbine 122 may generate airflow in any direction. The system 200 may come into use in cases in which the vehicle 102 unexpectedly leaves the road or becomes airborne. In these cases, the system 200 may additionally include one or more sensors 212 disposed on or near each turbine cylinder 124. The one or more sensors 212 may be tilt sensors or proximity sensors, among other types of sensors. A sensor 212 for detecting proximity may point toward a road surface (i.e., the ground), and upon a distance from the road surface to the proximity sensor 212 increasing past a threshold distance, the proximity sensor 212 may indicate to controller 400 that vehicle 102 is airborne. Controller 400 may then cause a respective turbine 122 connected to each of electric motors 204A through 204D to point downwards and rotate at a speed sufficient to generate enough airflow to allow vehicle 102 to slowly descend to the ground. Once the proximity sensor 212 detects that vehicle 102 has come back within the threshold distance, each of turbines 122 may decrease the speed of rotation until vehicle 102 has safely landed. Some of sensors 212 may be tilt sensors, and may ensure that vehicle 102 is kept level as vehicle 102 returns to the ground. Alternatively, or in addition, mercury switches or air bubble tilt sensors or inclinometers may be utilized to detect tilt and activate turbines 122.

In some cases, if vehicle 102 experiences an accident, vehicle 102 may begin to roll side-over-side or end-over-end. System 200 may work to stop vehicle 102 from rolling, or to flip vehicle 102 the right way up should vehicle 102 land upside down. If a tilt sensor 212 indicates that vehicle 102 is about to roll in a direction, controller 400 may cause certain turbines 122 to generate airflow to propel vehicle 102 in an opposite direction. Each of turbine cylinders 124 may be angled to cause turbines 122 to push air in a specified direction to more quickly restore vehicle 102 to a stable state. For example, should vehicle 102 roll toward the right, electric motor 204C and electric motor 204A may each cause a respective turbine 122 to generate air downwards, lifting a right half of vehicle 102 and preventing further rolling toward the right. Simultaneously, electric motor 204B and electric motor 204D may cause a respective turbine 122 to generate air upwards, pushing a left half of vehicle 102 back towards the ground. Turbines 122 may be rotated until the tilt sensor 212 reads that vehicle 102 is level and the proximity sensor 212 indicates that vehicle 102 is fully on the ground.

In another example, the tilt sensor 212 may detect that the rear side 110 of vehicle 102 is raised above the front side 104 of vehicle 102, thus indicating that vehicle 102 may roll end-to-end. In this example, controller 400 may cause a respective turbine 122 of electric motor 204C and electric motor 204D to generate air downwards, or may cause a respective turbine 122 of electric motor 204A and electric motor 204B to generate air upwards, until the tilt sensor 212 reads that vehicle 102 is level. Each turbine 122 may continue to generate a decreasing amount of airflow until the proximity sensor 212 indicates that vehicle 102 is on the ground. In a case in which vehicle 102 has landed entirely upside down, system 200 may function similarly to generate airflow using turbines 122 until vehicle 102 is flipped the right way up.

Some of sensors 212 may be water sensors. In the case that vehicle 102 has left the ground and landed in a body of water, a water sensor 212 may signal to controller 400 to activate one or more turbines 122 to bring vehicle 102 to the surface of the water. If vehicle 102 lands right-side-up, according to the tilt sensor 212, controller 400 may cause the one or more turbines 122 to generate air and water downwards until vehicle 122 has surfaced. The one or more turbines 122 may then continue to rotate, thus keeping vehicle 102 afloat. In a case in which vehicle 102 has landed at an angle according to the tilt sensor 212, each of the turbines 122 may tilt and rotate until vehicle 102 is level. In aspects, main electric motor 206 may cause fan 210 to rotate, allowing vehicle 102 to move through the water toward land.

The system 200 of FIG. 6 may otherwise function similarly to system 100, and may include all components of system 100 for causing vehicle 102 to charge a battery 150 in response to airflow. Electric motor 206 may function similarly to electric motor 148 of system 100, and may connect to a driveline pulley 136 via an electric motor shaft 146. Rotation of driveline pulley 136 may be actuated through driving belts 134, which connect to pulleys 132. Like system 100, pulleys 132 may be rotated by associated turbines 122, gear drive shafts 126, gears 128, and gear output shafts 130, all of which are omitted in FIG. 6 for purposes of clarity. As driveline pulley 136 is rotated by driving belts 134, drive shaft 138 is rotated and transmits energy to an axle differential 142 and an axle 140 (not shown) to power vehicle 102. Electric motor 206 may additionally couple to charging pulleys 154 or auxiliary charging pulleys 152 via charging belt 156 to charge batteries 150 (not shown).

As described in greater detail regarding FIG. 4, in aspects, the system 200 may not harness airflow to power vehicle 102. However, operation of any of electric motors 204A through 204D or electric motor 206 may result in rotation of driveline pulleys 136, thus causing rotation of the charging pulley 154, and in turn, driving of charging belt 156. By driving charging belt 156, battery 150 may be charged. Therefore, even when the system 200 is not being propelled by an intake in airflow, charging pulley 156 may still charge battery 150 and sustainably save energy to power vehicle 102.

System 200 may also include magnets 202 to initiate movement of vehicle 102 from a stationary state. Magnets 202 may be natural magnets, or electromagnets, and may each have a controllable magnetic field. In aspects, magnets 202 may be configured to cause rotation of gears 128 or rotation of turbine 122, to propel vehicle 102 forward. Gears 128 or turbine 122 may be formed from magnetic material, and the magnetic fields of a set of nearby magnets 202 may be controlled to pull or push gears 128 or turbine 122, causing each to rotate. Inducing rotation of gears 128 or turbine 122 may allow vehicle 102 to move short distances when external airflow cannot be used to power movement of vehicle 102.

In further aspects, a number of sensors 212 may be magnetic field sensors or proximity sensors, and magnets 202 may be used to "tow" vehicle 102 short distances. For example, upon sensing a nearby magnetic object via a magnetic field sensor 212, controller 400 may cause one or more magnets 202 to produce a magnetic field. Depending upon the desired direction of movement of vehicle 102, the magnetic field of the one or more magnets 202 may be caused to either repel or attract the magnetic object to induce vehicle 102 to move forwards, backwards, or sideways. For example, if vehicle 102 is blocking the roadway and lacks enough power to move, the magnetic field sensor 212 may determine that another vehicle ahead is generating a magnetic field. Controller 400 may cause the one or more magnets 202 to produce a magnetic field having an opposite polarity to the other vehicle ahead, thereby generating an attractive force. Vehicle 102 may then be pulled, or "towed," by the vehicle ahead. A proximity sensor 212 of vehicle 102 may ensure that vehicle 102 does not move beyond a predetermined threshold of proximity to the other vehicle ahead by signaling to controller 400 to stop the one or more magnets from producing the magnetic field if the vehicle enters the predetermined threshold of proximity. Therefore, vehicle 102 may be "towed" without fear of colliding with magnetic objects. Magnets 202 may be used to assist in moving vehicle 102 while vehicle 102 is either airborne or grounded.

Figure 7A:
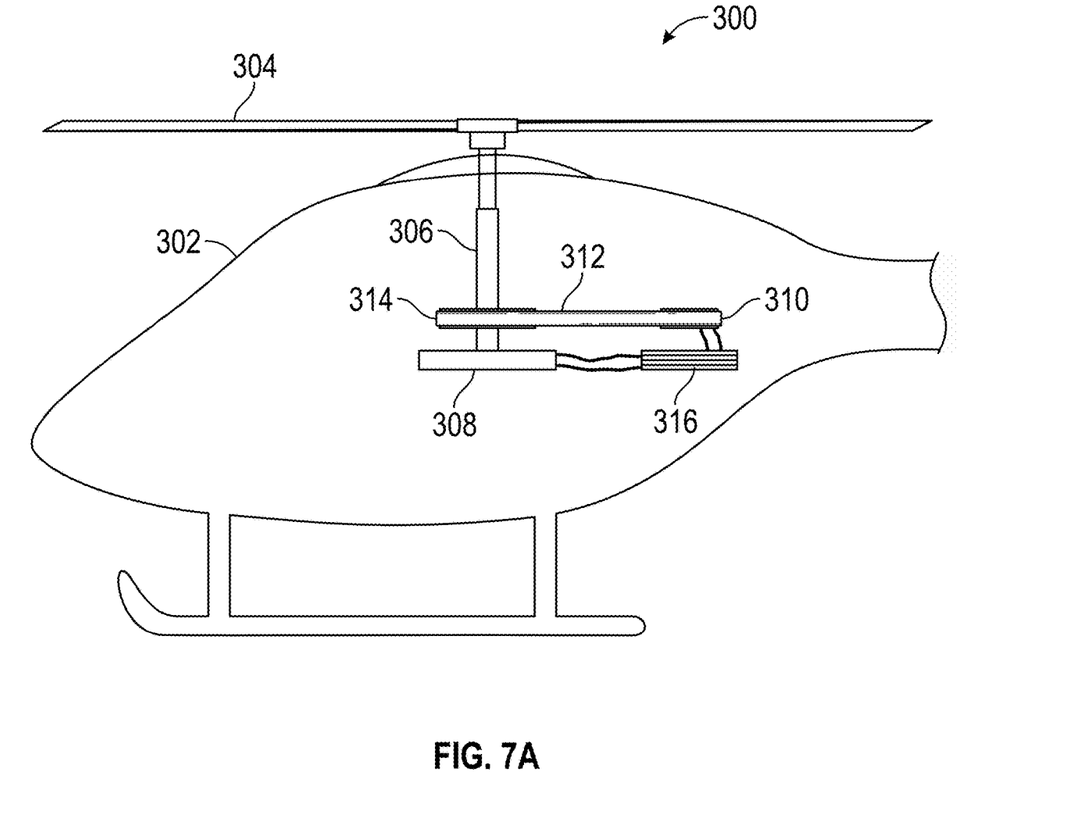
FIG. 7A shows an airflow charging system as incorporated into a main rotor of a helicopter, in accordance with aspects of the present disclosure.
Figure 7B:
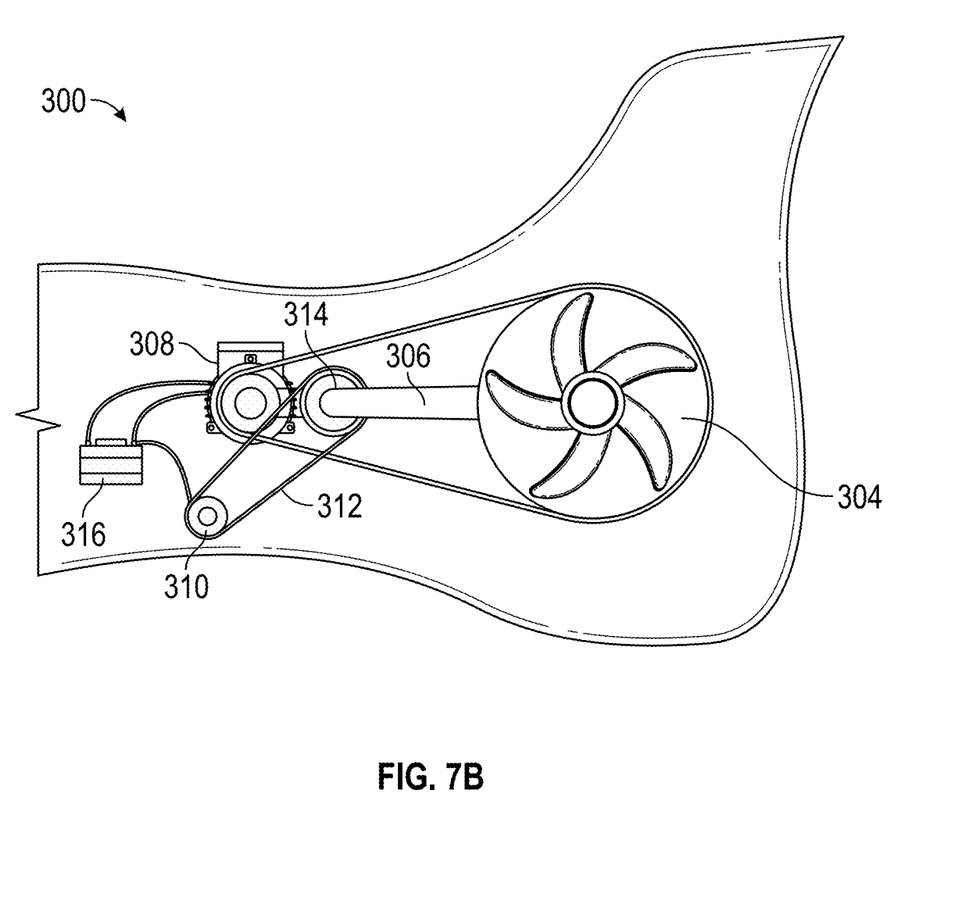
FIG. 7B depicts an airflow charging system as incorporated into a tail rotor of a helicopter, in accordance with aspects of the present disclosure.

FIGS. 7A and 7B illustrate yet another system 300 for using airflow to charge an electric motor of a vehicle, specifically an aircraft. In this case, vehicle 302 is a helicopter. FIG. 7A depicts system 300 as applied to a main rotor, that is, a propeller 304, of the vehicle 302. Through a drive shaft 306, an electric motor 308 may rotate propeller 304. A driveline pulley 314 may be disposed on drive shaft 306, and rotate simultaneously with propeller 304. Via a charging belt 312, driveline pulley 314 may connect to a charging pulley 310, which charges a battery 316. Battery 316 may in turn power electric motor 308. FIG. 7B shows a similar configuration of system 300 for a tail rotor, that is, an additional propeller 304, of the vehicle 302. A drive shaft 306, powered by an electric motor 308, causes propeller 304 to rotate. Simultaneously, a driveline pulley 314 is rotated by drive shaft 306. Driveline pulley 314 connects to a charging pulley 310 through a charging belt 312. Charging pulley 310 thereby charges a battery 316, which provides power to electric motor 308.

Figure 8A:
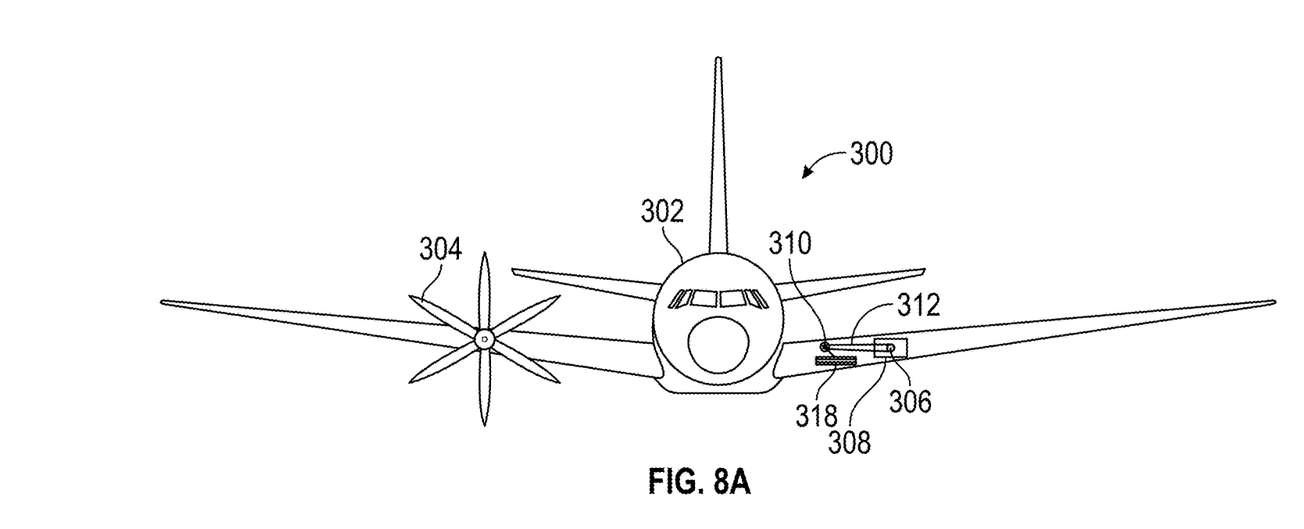
FIG. 8A illustrates an airflow charging system as incorporated into a propeller plane, with a propeller removed to view the airflow charging system, in accordance with aspects of the present disclosure.
Figure 8B:
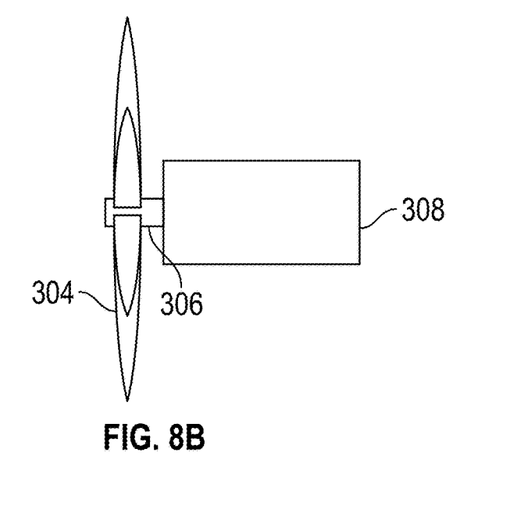
FIG. 8B shows the propeller of FIG. 8A as connected to an electric motor, in accordance with aspects of the present disclosure.

FIGS. 8A and 8B show another configuration of system 300, in which vehicle 302 is a propeller plane. In FIG. 8A, vehicle 302 is shown with one propeller 304 removed, to view the components of system 300, which FIG. 8B shows how propeller 304 connects to electric motor 308. Here, as in FIGS. 7A and 7B, electric motor 308 rotates propeller 304 via drive shaft 306. Drive shaft 306 may include driveline pulley 314 (not shown) disposed thereon, which connects to charging pulley 310 using charging belt 312. By charging pulley 310, battery 316 is charged, and provides power to electric motor 308.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein.

Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for charging an electric motor, comprising:
   a driveline pulley operably connected to an electric motor, the driveline pulley including a driving belt operably connected to a drive shaft;
   a charging pulley operably connected to the driveline pulley, the charging pulley including a charging belt, wherein rotation of the charging pulley is configured to charge a battery, and wherein the battery provides power to the electric motor;
   a processor; and
   a memory, including instructions stored thereon, which, when executed by the processor cause the system to:
   operate the electric motor via the battery to rotate the driveline pulley, wherein the driveline pulley powers the drive shaft; and
   rotate the charging pulley to charge the battery.

2. The system of claim 1, further comprising a sensor configured to determine a tension of the driving belt and a tension of the charging belt.

3. The system of claim 2, wherein the instructions, when executed by the processor, further cause the system to:
   determine a charging quality based on the tension of the charging belt; and
   determine a power loss based on the tension of the driving belt.

4. The system of claim 1, further comprising a sensor, wherein the instructions, when executed by the processor, further cause the system to:
   determine a charge percentage of the battery; and
   if the charge percentage of the battery is above a predetermined threshold, disconnect the charging pulley from charging the battery.

5. The system of claim 1, further comprising an auxiliary charging pulley operably connected to the battery, wherein the battery is charged by rotation of the charging pulley causing rotation of the auxiliary charging pulley.

6. The system of claim 1, further comprising a turbine configured to rotate the driveline pulley, wherein the turbine is configured to receive air flow via an intake vent, and wherein the instructions, when executed by the processor, further cause the system to:
   upon receiving an input, stop operating the electric motor to rotate the driving pulley;
   open the intake vent, causing airflow to rotate the turbine;
   rotate the driveline pulley via the turbine, thus rotating the charging pulley to charge the battery.

7. The system of claim 6, further comprising a fan configured to provide air flow to the turbine.

8. The system of claim 6, wherein the input is the system reaching a predetermined speed.

9. The system of claim 6, further comprising an outlet configured to vent air out of the system after the air has entered the intake vent and caused the turbine to rotate.

10. The system of claim 6, further comprising an air filter disposed configured to filter air after the air has entered the intake vent and caused the turbine to rotate.

11. A vehicle for using airflow to charge an electric motor, the vehicle comprising:
   a driveline pulley, the driveline pulley including a driving belt operably connected to a drive shaft;
   an electric motor operably connected to the driveline pulley;
   a charging pulley operably connected to the driveline pulley, the charging pulley including a charging belt;
   a battery, wherein rotation of the charging pulley is configured to charge the battery, and wherein the battery provides power to the electric motor;
   a processor; and
   a memory, including instructions stored thereon, which, when executed by the processor cause the vehicle to:
      operate the electric motor to rotate the driveline pulley, wherein the driveline pulley powers the drive shaft; and
      rotate the charging pulley to charge the battery.

12. The vehicle of claim 11, further comprising a sensor configured to determine a tension of the driving belt and a tension of the charging belt.

13. The vehicle of claim 12, wherein the instructions, when executed by the processor, further cause the vehicle to:
   determine a charging quality based on the tension of the charging belt; and
   determine a power loss based on the tension of the driving belt.

14. The vehicle of claim 11, wherein the vehicle further includes a sensor, wherein the instructions, when executed by the processor, further cause the vehicle to:
   determine a charge percentage of the battery; and
   if the charge percentage of the battery is above a predetermined threshold, disconnect the charging pulley from charging the battery.

15. The vehicle of claim 11, further comprising an auxiliary charging pulley operably connected to the battery, wherein the battery is charged by rotation of the charging pulley causing rotation of the auxiliary charging pulley.

16. The vehicle of claim 11, further comprising a turbine configured to rotate the driveline pulley, wherein the turbine is configured to receive airflow via an intake vent, and wherein the instructions, when executed by the processor, further cause the vehicle to:
   upon receiving an input, stop operating the electric motor to rotate the driving pulley;
   open the intake vent, causing airflow to rotate the turbine;
   rotate the driveline pulley via the turbine, thus rotating the charging pulley to charge the battery.

17. The vehicle of claim 16, further comprising a fan configured to provide air flow to the turbine.

18. The vehicle of claim 16, wherein the input is the vehicle reaching a predetermined speed.

19. The vehicle of claim 16, further comprising an outlet configured to vent air out of the vehicle after the air has entered the intake vent and caused the turbine to rotate.

20. The vehicle of claim 16, further comprising an air filter disposed configured to filter air after the air has entered the intake vent and caused the turbine to rotate.

* * * * *